INVENTOR

AKIRA YAMANAKA

BY Watson, Cole, Grindle & Watson

ATTORNEYS

INVENTOR
AKIRA YAMANAKA
BY Watson, Cole, Grindle & Watson
ATTORNEYS

United States Patent Office
3,533,573
Patented Oct. 13, 1970

1

3,533,573
COOPERATION DEVICES FOR FILM WINDING AND SHUTTER MECHANISM
Akira Yamanaka, Toyokawa-shi, Japan, assignor to Minolta Camera Kabushiki Kaisha, Osaka, Japan, a corporation of Japan
Filed Oct. 1, 1968, Ser. No. 781,292
Claims priority, application Japan, Oct. 4, 1967, 42/84,624
Int. Cl. G03b 1/06
U.S. Cl. 242—71.5        5 Claims

ABSTRACT OF THE DISCLOSURE

The present invention concerns the cooperation of the film winding and the shutter operation mechanism of a simple self-cocking camera, in which the film winding device is connected with the shutter operation part by means of a partially-toothed gear, the rotation of the film winding axle through a certain angle serving to set the shutter operation mechanism, so that the shutter setting is made possible in spite of variations in the angle of rotation of the film winding axle for winding a single frame of the film.

BACKGROUND OF THE INVENTION

The conventional film winding in the roll-film camera has been being done either by the sprocket wheel or directly by the film winding axle. With the former, although the rotation degrees of the sprocket wheel for winding a single frame of the film is constant, the cooperation mechanism of the sprocket axle and the winding axle is complicated, and with the latter, the rotation degrees of the winding axle for winding a single frame of the film change as the amount of the film wound up on the winding axle increases. On the other hand, for the purpose of charging the shutter it is necessary to let the shutter setting parts move a certain constant space back and forth, and therefore with the latter in which the rotation degrees for winding a single frame of the film change the cooperation mechanism of the shutter charge and the film winding becomes complicated and also some other driving part becomes necessary for opening and closing the shutter, all of which makes the entire construction still more complicated and therefore setting the self-cocking mechanism in the inexpensive camera has been difficult.

SUMMARY OF THE INVENTION

The present invention is rid of the aforesaid defects of the conventional devices and makes possible the self-cocking by means of a simpler mechanism together with the driving of the shutter: the film winding gear of the film winding axle is in mesh with the partially-toothed gear with a toothless part of the shutter operation part, and the pulling spring for driving the shutter is set on the shutter operation part and is extended by the rotation of the film winding axle, and after the spring is charged beyond its dead point where it is extended most, the two gears are disengaged by the toothless part, and after charging the shutter operation part the winding of one frame of the film is completed, and the shutter is driven by the returning power of the charged pulling spring; and also for the purpose of securely establishing the re-engagement of the partially-toothed gear and the winding gear after the exposure is achieved by the shutter operation part which has driven the shutter and is now in the position where the pulling spring is extended least, the intermediate gear train is arranged between the two gears and the gear train is to be connected by a clutch with the partially-toothed gear.

DESCRIPTION OF THE PREFERRED EMBODIMENT

Figure 1:
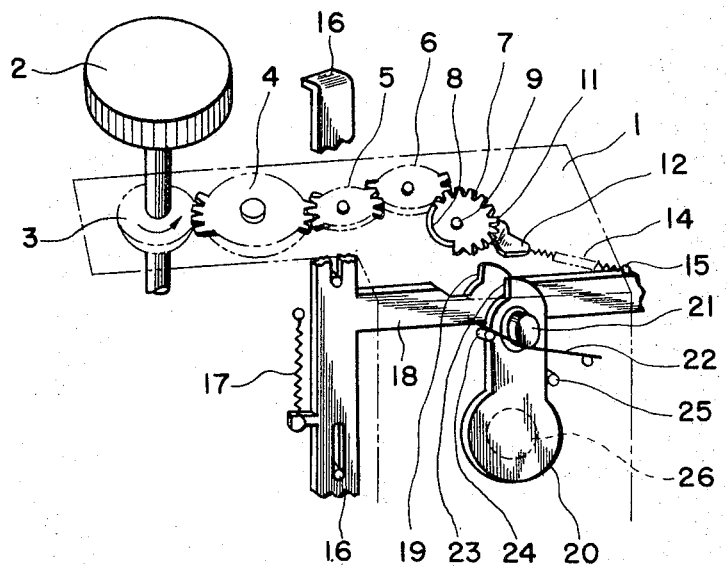
FIG. 1 is the perspective view showing the construction of the essential parts of a preferred embodiment of the present invention.

To describe the construction of the present invention according to the preferred embodiment shown in the figures: Through the table 1 which is fixed on the camera body is set the film winding axle 2 in such a way that it can revolve only in the direction of the arrow in FIG. 1, and the film winding gear 3 which is fixed onto the axle 2 is in mesh with the intermediate gears 4, 5 and 6 forming a train of gears. The partially-toothed gear 7 which is in mesh with the final gear 6 at the end of the gear train has the toothless part 8 just a little less than 180° and is rotatably mounted, in one with the shutter operation part 11, onto the table 1 by the axle 9. The detail is shown in FIG. 2; onto one end of the axle 9 going through the axle supporting sheath 10 formed on the table 1 is fixed the partially-toothed gear 7 and onto the other the shutter operation part 11.

In revolving through the minimum angle in which one frame of the film is wound up by the film winding axle, the partially-toothed gear 7, gear 3 fixed on the film winding axle, and intermediate gears 4, 5 and 6 operatively connecting gears 3 and 7, will turn the shutter operation part 11 fixed to said partially-toothed gear 7 through more than 180°, the gear ratio being such that the meshing engagement between said partially-toothed gear 7 and intermediate gear 6 will be interrupted during the winding operation by reason of said toothless part 8.

The shutter operation part is a flat lever the tip of which is formed into the driving part 12 under which is the pin 13. Between the pin 13 and the fixed pin 15 formed on the table 1 or on the camera body is set the pulling spring 14 for driving the shutter.

The release lever 16 which forms the shutter release part moves up and down guided by the groove in it and the fixed pin planted on the table or the camera body and is given by the spring 17 a tendency to stay in its upward position. From this release lever projects the side arm 18 and the catch 19 formed on the side arm projects, when the release lever 16 is in its upward position, into the path of the rotation of the driving part 12 of the shutter operation part 11.

Figure 2:
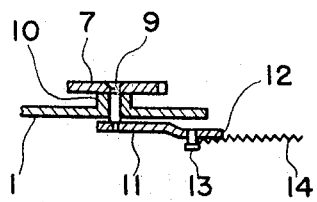
FIG. 2 is the partial side cross section showing the connecting construction of the partially-toothed gear and the shutter operation part of the said preferred embodiment.

The shutter blade 20 which consists of a single covering plate is rotatably mounted on the table 1 by the axle 21 and is given by the return spring 22 a tendency to rotate in the counterclockwise direction in FIG. 1 and is stopped by the stop pin 25 in the position to cover the photographing lens 26. On the other end of the shutter blade 20 across the axle 21 is formed the catch 23 which is arranged to come, when the release lever 16 is in its upward position, into the path of the rotation of the driving part 12 of the shutter operation part 11 nearer than the catch 19 to the fixed pin 15 of the pulling spring 14.

Figure 3:
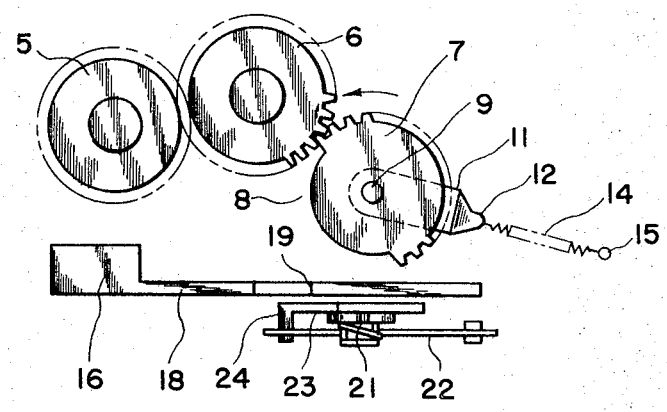
FIGS. 3, 4 and 5 are the top views showing the operation of the said preferred embodiment, with FIG. 3 showing the state just after the exposure by the shutter is completed, FIG. 4 the state in which the charge of the shutter operation part is finished by the film winding operation, and FIG. 5 showing the state just before the shutter operation part drives the shutter blade after the operation of the release part.
Figure 4:
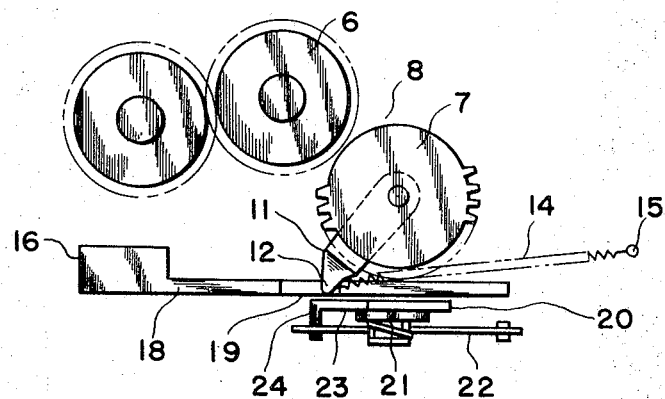

Because of the construction as described above of the present invention, in the state just after the exposure as is shown in FIG. 3, the driving part 12 of the shutter operation part 11 is pulled by the spring 14 toward the fixed pin 15, and the first tooth of the partially-toothed gear 7 is just in mesh with the final gear 6 at the end of the gear train of the film winding gear 3. Then, when the film winding knob 2 is rotated to wind up one frame of the film, the final gear 6 rotates in cooperation with the rotation of the film winding gear, and the partially-toothed gear 7 whose first tooth is in mesh with the final gear 6 begins to rotate in the direction of the arrow in FIG. 3 and with it rotates the shutter operation lever 11 in the same direction against the pulling spring 14 extending and energizing it. As the film winding knob is rotated further, the pulling spring 14 goes beyond the dead point where it is extended most and the toothless part 8 a little less than 180° comes face to face with the gear 6 and the gears 6 and 7 become disengaged and the shutter operation part 11 quickly rotates for a small angle pulled by the energized pulling spring 14 and the driving part 12 is caught and stopped in the position to set the shutter by the catch 19 on the side arm 18 of the release lever 16 in its upward position. The film winding gear, on the other hand, rotates further for certain degrees and stops, just as one frame of the film is wound up, stopping the rotation of the film winding knob 2. Thus the film winding is completed, and the shutter is charged, ready for the next photographing as is shown in FIG. 4.

Figure 5:
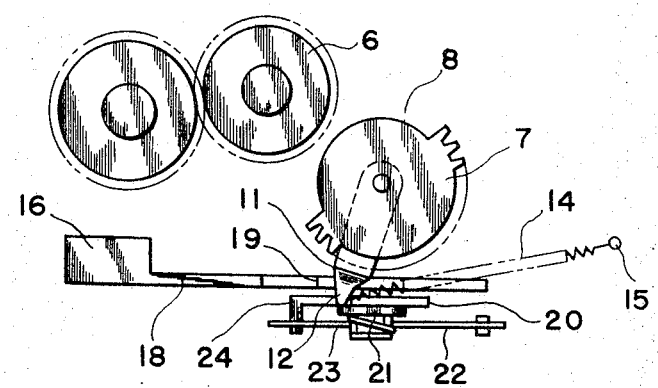

When the release lever 16 is pressed down for the purpose of photographing, the catch 19 on the side arm 18 goes down and the disengaged driving part 12 of the shutter operation part 11 starts to rotate quickly pulled by the energized spring 14 and in the course of its rotation strikes the projecting catch 23 of the shutter blade 20 as is shown in FIG. 5), kicking and driving it, and stops in the position shown in FIG. 3. The driven shutter blade 20, on the other hand, reveals the photographing lens 26 and, completing the given amount of exposure, returns to the position shown in FIG. 3 by means of the return spring 22. And as is shown in FIG. 3, the first tooth of the partially-toothed gear 7 is again in mesh with the final gear 6 of the gear train of the film winding gear 3. Thus the aforesaid operation can be repeated again.

Figure 6:
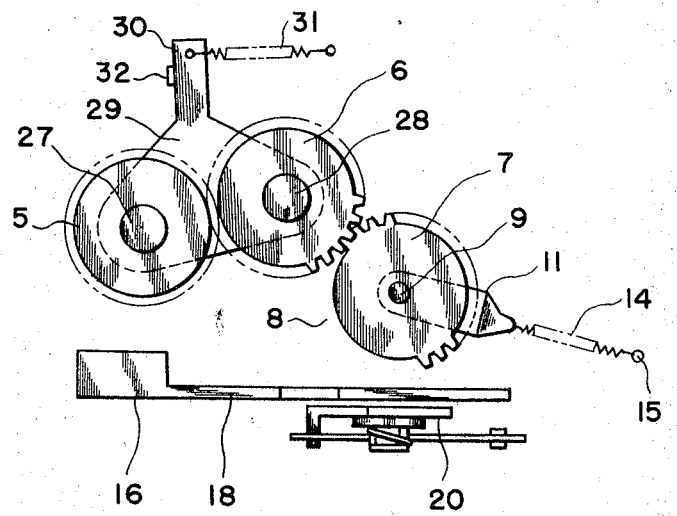
FIGS. 6 and 7 show the top views of another embodiment in which the film winding gear train and the partially-toothed gear are connected by a clutch, FIG. 6 showing the state in which the clutch is in and FIG. 7 the state in which the clutch is off.
Figure 7:
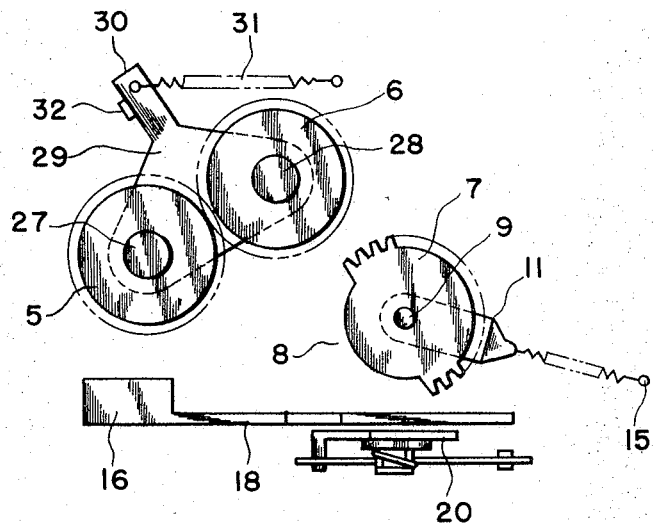

If the engagement of the first tooth of the partially-toothed gear 7 and the final gear 6 is not achieved completely after the shutter is driven by the driving part 12, further rotation of the film rewinding gear may not be continued smoothly, and the embodiment shown in FIGS. 6 and 7 can solve this problem.

In this embodiment, the final gear of the gear train is to be engaged by means of a clutch. The clutch plate 29 is rotatably mounted by the axle 27 of the intermediate gear 5 and on this clutch plate 29 is mounted the final gear 6 by the axle 28 so as to be in mesh with the intermediate gear 5. The clutch plate 29 has the operation handle 30 and the spring 31 gives the clutch plate 29 a clockwise rotation tendency pulling the final gear 6 towards the partially-toothed gear 7. Therefore, by pressing the operation handle 30 and rotating the clutch plate 29 in the counterclockwise direction against the spring 31 and then releasing the handle 30 so that the final gear 6 may be pulled towards the partially-toothed gear 7, the engagement of the final gear and the first tooth of the partially-toothed gear can be securely achieved. 32 shows the projecting pin which is stopped by the stop pin 33 which is formed on the table 1 for the purpose of stopping and keeping the clutch plate 29 against the spring 31 in the position where the gears 6 and 7 can remain in mesh.

What is claimed is:

1. In a camera having a film winding axle and a shutter mechanism, means operatively connecting the film winding axle and the shutter mechanism, comprising a first gear fixed on said axle, a second axle, means rotatably supporting said second axle on said camera, a partially-toothed gear fixed on said second axle, a shutter operation part fixed on said second axle to rotate with said partially-toothed gear, the toothless part of said last mentioned gear being slightly less than 180° in extent, a spring pulling said shutter operation part toward one position, gear means operatively connecting said first gear and said partially-toothed gear whereby during part of the film winding rotation of said film winding axle said partially-toothed gear and shutter operation part are rotated more than 180° to extend said spring past its dead center position and to position the toothless part of said partially-toothed gear opposite the adjacent member of said gear means, thereby releasing said shutter operation part from said winding axle for movement toward said one position, a tooth of said partially-toothed gear engaging said adjacent member of said gear means when said shutter operation part returns to said one position.

2. The combination defined in claim 1, said adjacent member of said gear means being journaled on an axle parallel to said second axle, said axle of said adjacent member being movable toward and away from said second axle, and means urging said axle of said adjacent member toward said second axle to cause said adjacent member to engage a tooth of said partially-toothed gear.

3. The combination defined in claim 1, the gear ratios between said gear on said winding axle, said partially-toothed gear, and the said connecting gear means being such that a minimum rotation of said winding axle necessary to wind up one frame of film will rotate said partially-toothed gear more than 180°.

4. The combination defined in claim 1, including a movable shutter release member having a catch, and means urging said release member toward a position in which said catch lies in the path of said shutter operation part, said catch being movable out of said path by movement of said release member in opposition to said urging means.

5. The combination defined in claim 4, said shutter mechanism including a movable shutter blade having a projecting catch, means urging said shutter toward closed position in which position said shutter blade catch lies in the path of said shutter operation part, said shutter blade being movable to open position by said shutter operation part engaging said shutter blade catch as said shutter operation part moves toward said one position upon its release by movement of said shutter release member.

References Cited
UNITED STATES PATENTS 1,513,268   10/1924   Pawley _____ 242—71.5
2,350,693    6/1944   Moomaw et al. _____ 242—71.5

NATHAN L. MINTZ, Primary Examiner